United States Patent [19]

Okazaki

[11] 4,164,288

[45] Aug. 14, 1979

[54] COAT HANGER STAND

[76] Inventor: Hiroshi Okazaki, 1-12, Shimojugo 5-chome, Kita-ku, Tokyo, Japan, 114

[21] Appl. No.: 866,234

[22] Filed: Jan. 3, 1978

[30] Foreign Application Priority Data

Jun. 17, 1977 [JP] Japan .............................. 52-79347[U]

[51] Int. Cl.² .............................................. A47F 5/13
[52] U.S. Cl. .................................... 211/207; 248/411; 403/109
[58] Field of Search .................... 248/411, 412, 414; 211/204, 207, 208, 190; 403/109

[56] References Cited

U.S. PATENT DOCUMENTS

| 389,005 | 9/1888 | Peck | 248/412 |
| 516,347 | 3/1894 | Chamberlin | 211/207 X |
| 2,224,527 | 12/1940 | Strobel | 248/412 |
| 2,747,824 | 5/1956 | Darnell | 248/412 |
| 3,197,035 | 7/1965 | Wolf | 211/204 |
| 3,871,780 | 3/1975 | Svensson | 248/411 X |
| 3,896,744 | 7/1975 | Goebl | 248/412 X |
| 3,908,944 | 9/1975 | Bjork | 248/411 X |

FOREIGN PATENT DOCUMENTS

| 2270477 | 12/1975 | France | 248/411 |
| 441977 | 1/1968 | Switzerland | 211/207 |

Primary Examiner—Roy D. Frazier
Assistant Examiner—Robert W. Gibson, Jr.
Attorney, Agent, or Firm—Holman & Stern

[57] ABSTRACT

This invention relates to a coat hanger stand mainly used by dealers of clothing articles, and more particularly to a stand for coat hangers of which the position of the bar for hanging coat hangers can freely be adjusted in a vertical direction.

3 Claims, 5 Drawing Figures

U.S. Patent  Aug. 14, 1979  Sheet 2 of 3  4,164,288
FIG.2  FIG.3  FIG.4
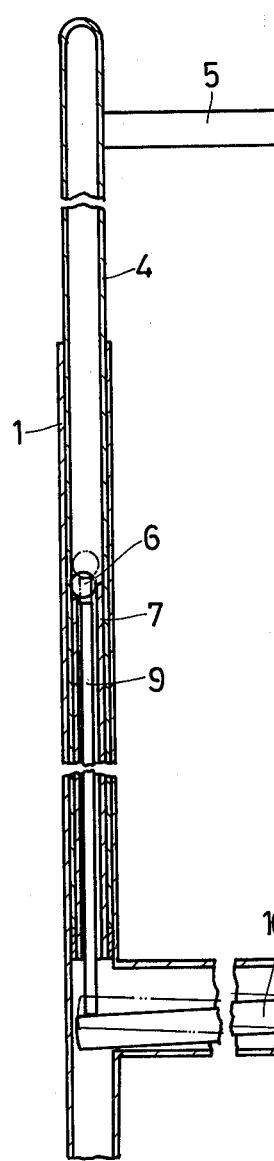
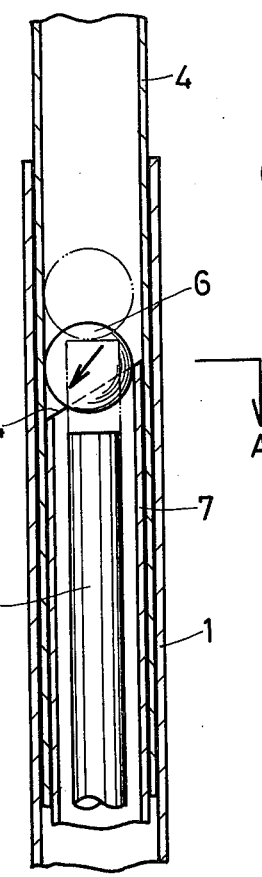
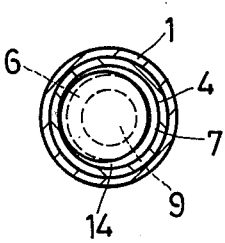
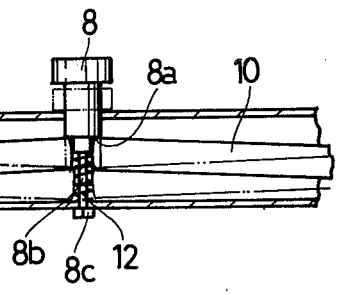

COAT HANGER STAND

BACKGROUND OF THE INVENTION

In conventional coat hanger stands, the mechanism for vertically adjusting the position of the bar for hanging coat hangers has comprised screws for locking the bar at the adjusted position after it has been adjusted in a vertical direction. Accordingly, it has been very troublesome to complete the adjustment of the coat hanger bar at its both ends so that dealers in general have been suffering much inconveniences in dealing with such coat hanger stands.

SUMMARY OF THE INVENTION

It is an object of the present invention to eliminate the aforementioned drawbacks of the prior art for coat hanger stands.

Another object of the present invention is to provide a coat hanger stand which is simplified and breakdown-proof in the construction.

Still another object is to provide a coat hanger stand of which the position of the coat hanger bar can be adjusted simultaneously at its both ends.

It is still another object of the present invention is to provide a coat hanger stand in which the hanger bar can be locked securely at any position for adjustment and released instantly and smoothly when required.

The invention will now be described with reference to the accompanying drawings showing one preferred embodiment of the coat hanger stand according to this invention.

BRIEF DESCRIPTION OF THE DRAWINGS

FIG. 2 is a front vertical sectional view of a principal portion of the stand;

FIG. 3 is an enlarged vertical sectional view of a portion of the stand;

FIG. 4 is a sectional view taken along the line A—A' in FIG. 3; and

DETAILED DESCRIPTION OF THE INVENTION

Figure 1:
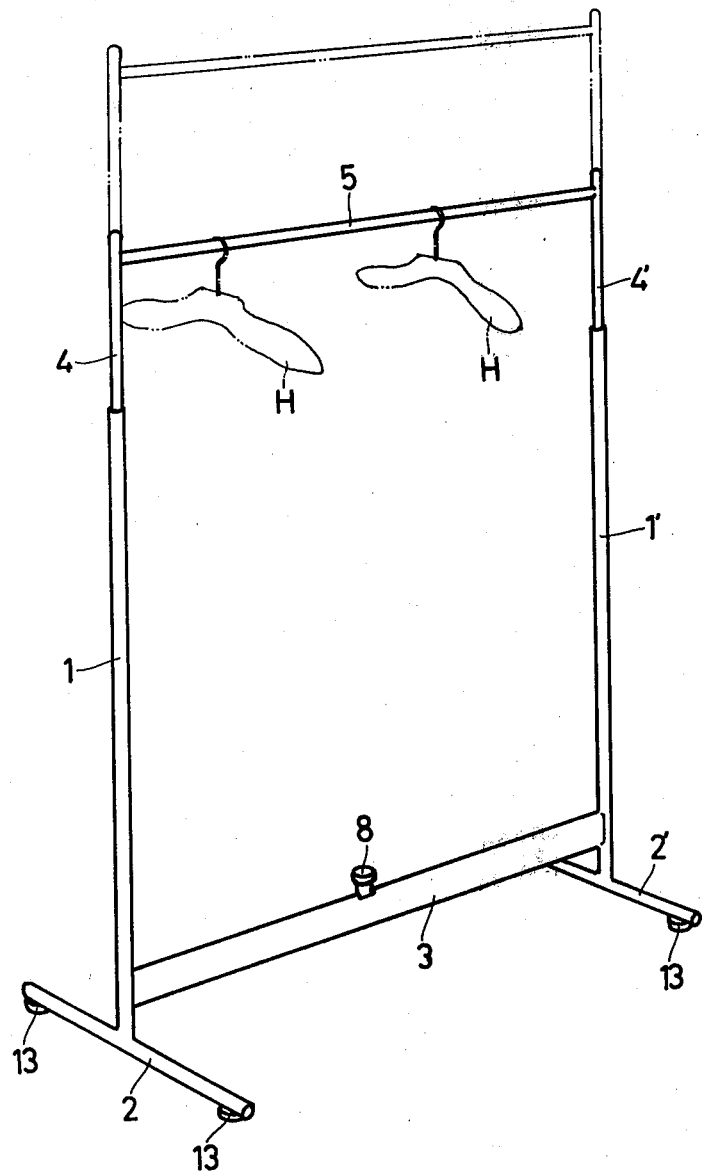
FIG. 1 is a perspective view of a coat hanger stand according to this invention.

This invention relates to a coat hanger stand having a coat hanger bar freely adjustable in a vertical direction the construction of which will be described in detail in the following.

In the drawings, 1, 1' indicate a pair of vertical tubes to which is attached at the foot thereof a cross rod 2, 2', respectively, in the form of a reverse "T", and both vertical tubes 1, 1' are connected with each other by means of a connecting tube 3. 4, 4' are adjusting tubes inserted in the vertical tubes 1, 1', respectively, so as to be vertically adjustable, and both adjusting tubes 4, 4' are connected with each other by means of a coat hanger bar 5 provided for hanging coat hangers thereon.

A pressure tube 7 is inserted in each of the vertical tubes 1, 1' for pressing and supporting a locking ball 6 with the inside wall surface of the adjusting tubes 4, 4', said locking ball 6 being inserted in the adjusting tubes 4, 4'. In the pressure tube 7 there is inserted a striker rod 9 which is vertically movable for pushing up the locking ball 6 to thereby release the locking action thereof, said rod 9 being so provided as to be driven upwardly by means of a rocking rod 10 provided within the connecting tube 3 and actuated through the operation of a foot pedal 8 projecting upwardly from the connecting tube 3. 11 is a pivot pin on which is mounted the rocking rod 10 at the intermediate point thereof. 12 is a return spring mounted on a bolt 8b so as to act on the foot pedal 8 with a step 8a formed on the lower portion thereof. The bolt 8b depends from the step 8a and the end portion of the bolt 8a is so inserted through the connecting tube 3 that one end of the rocking rod is engaged with the step 8a by means of a nut 8c, the other end of the rocking rod 10 being in contact with the lower end of the striker rod 9. When the foot pedal 8 is depressed against the action of the return spring 12 the rocking rod 10 will be pushed down by the step 8a so that the striker rod 9 will be forced upwardly. 13 indicates a supporting leg.

Figure 5:
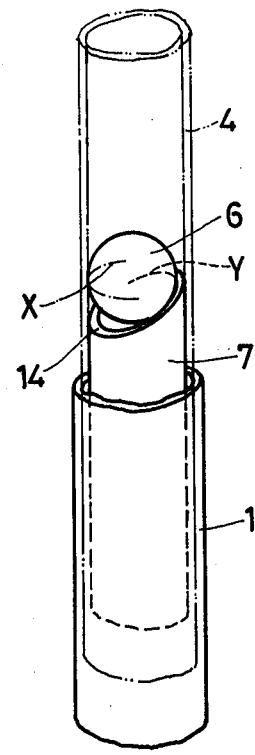
FIG. 5 is a perspective view showing a state of contact of the locking ball of this invention.

The top end of the pressure tube 7 is obliquely cut to provide a slant edge 14 to receive the locking ball 6 therein. The ball 6 is loaded with force by the weight of the hanger bar 5 and that of the adjusting tubes 4, 4' in the direction as indicated by the arrow in FIG. 3 so that the ball tends to come downwardly into arcuate contact with the inside wall surface of the adjusting tubes 4, 4' as shown by "X" in FIG. 5 and at the same time to come into arcuate contact also with the inside of the slant edge of the pressure tube 7 as shown by "Y", the contact point indicated by "Y" being slightly lower than and at an offset position from that indicated by "X", thereby positively locking the adjusting tubes 4, 4'. That is to say, the locking operation of the ball 6 will be effected completely through the offset contact of the ball 6 with the adjusting tubes 4, 4' as well as the pressure tube 7 with the result that the wedge effect will sufficiently be obtained.

According to the present invention, when the foot pedal 8 is depressed the striker rod 9 will be forced upwardly so as to strike and release the locking ball 6 from its locking action. Namely, the locking ball 6 which is in the locked state under the pressure of the selfweight of the hanger bar 5 and that of the adjusting tubes 4, 4' will be removed by the projecting action of the striker rod 9 so that the adjusting tubes 4, 4' will freely be adjusted in a vertical direction. Therefore, the hanger bar 5 will be adjusted relative to its position in accordance with the length of the garments to be hung thereon. And when the foot pedal 8 has been released, the locking ball 6 will come into close contact with the slant edge 14 of the pressure tube 7 and the inside wall surface of the adjusting tubes 4, 4' as mentioned above, so that the adjusting tubes 4, 4' will be locked at the adjusted position. Especially, in the coat hanger stand according to this invention, since both two adjusting tubes 4, 4' can be adjusted so as to be locked simultaneously at the same level the operation will be so easy that even a very delicate adjustment may be effected in a short time.

I claim:

1. A coat hanger stand comprising a base means, a pair of spaced tubular uprights on said base means, a pair of inner-tube members telescopically received in the respective uprights, a cross bar attached to said inner-tube members for carrying coat hangers and a height adjusting means for releasably locking the inner-tube members at selected heights within said uprights, said height adjusting means comprising in each upright a pressure tube within said inner-tube, said pressure tube being fixed relative to said upright and terminating in a sloping upper end and a ball in said inner-tube above said pressure tube, the weight of said inner-tube and cross bar urging said ball downwardly into arcuate pressure contact on one side of the ball with an internal surface portion of the inner-tube and on the other side of the ball into arcuate pressure contact with an internal surface portion of said sloping upper end of the pressure tube to lock the inner-tube in position with respect to said pressure tube and a striker rod within said pressure tube for lifting the ball to release said pressure contact and free the inner-tube for vertical movement relative to the upright and base means.

2. The coat hanger stand of claim 1 including lever means for operating the respective striker rods in unison.

3. The coat hanger stand of claim 2 including a base connecting tube connecting said uprights, said lever means being accommodated within said base connecting tube and a foot petal associated with said base connecting tube for actuating said lever means to operate said striker rods in unison.

* * * * *